(12) United States Patent
Juravic et al.

(10) Patent No.: US 8,507,026 B2
(45) Date of Patent: Aug. 13, 2013

(54) APPARATUS, SYSTEMS AND METHODS FOR MANUFACTURING FOOD PRODUCTS

(75) Inventors: Davor Juravic, San Pedro, CA (US); Yomayra Alvarez, Long Beach, CA (US); Oscar Ortiz, Hawthorne, CA (US); Dwayne P. McDowell, II, San Pedro, CA (US); Geoffrey Chase Thornhill, San Francisco, CA (US)

(73) Assignee: Del Monte Corporation, San Francisco, CA (US)

( * ) Notice: Subject to any disclaimer, the term of this patent is extended or adjusted under 35 U.S.C. 154(b) by 221 days.

(21) Appl. No.: 13/036,813

(22) Filed: Feb. 28, 2011

(65) Prior Publication Data
US 2012/0219693 A1 Aug. 30, 2012

(51) Int. Cl.
*A23P 1/10* (2006.01)

(52) U.S. Cl.
USPC ........... 426/646; 426/630; 426/644; 426/645; 426/513; 426/516; 426/517; 426/518; 426/805; 425/332; 425/371; 425/372

(58) Field of Classification Search
USPC ......... 426/630, 643–646, 512–513, 516–519, 426/802; 425/332–333, 363, 371–372
See application file for complete search history.

(56) References Cited

U.S. PATENT DOCUMENTS

| | | | | |
|---|---|---|---|---|
| 1,692,860 A | * | 11/1928 | Petri | 99/485 |
| 3,691,594 A | | 9/1972 | Klein | |
| 3,806,298 A | * | 4/1974 | Remensperger | 425/371 |
| 4,025,273 A | * | 5/1977 | Mauer et al. | 425/332 |
| 4,427,357 A | * | 1/1984 | Anderson | 425/333 |
| 4,435,144 A | * | 3/1984 | Kemper | 425/332 |
| 4,516,291 A | * | 5/1985 | Goldberger et al. | 426/513 |
| 5,330,344 A | * | 7/1994 | Konig | 425/321 |
| 5,674,547 A | * | 10/1997 | Vrouwenvelder | 426/500 |
| 6,039,993 A | * | 3/2000 | Vrouwenvelder | 426/496 |
| 6,248,384 B1 | * | 6/2001 | Morikawa et al. | 426/496 |
| 6,254,372 B1 | * | 7/2001 | Morikawa et al. | 425/329 |

* cited by examiner

*Primary Examiner* — Drew E Becker
(74) *Attorney, Agent, or Firm* — Dilworth Paxson LLP

(57) ABSTRACT

Apparatus, systems and methods are disclosed for manufacturing semi-moist meatballs. An illustrative embodiment provides a method of manufacturing generally spherical pet treats comprising: (a) providing a ground mix of proteinaceous material, flavor enhancers and preservatives to a portioning device that divides said mix into smaller portions of roughly uniform volume, (b) placing said portions on a first belt of a first conveyor moving at a first speed in a longitudinal direction, (c) periodically pressing said portions with a second belt of a second conveyor, where said second belt operates in a plane at a height above, and substantially parallel to, said first belt, said second belt moving at a second speed in substantially the same longitudinal direction as said first belt, while also oscillating back and forth in a lateral direction that is at an angle to said longitudinal direction, such that said portions are transformed into generally spherical shapes.

10 Claims, 4 Drawing Sheets

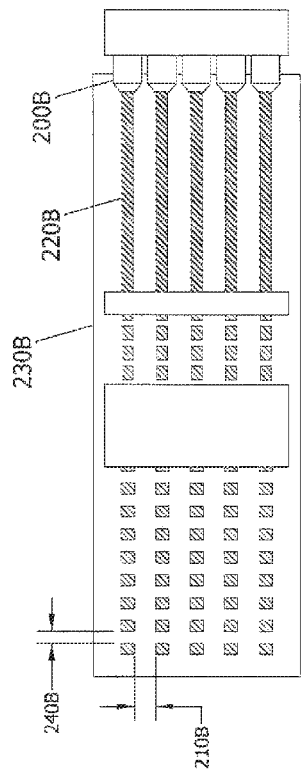
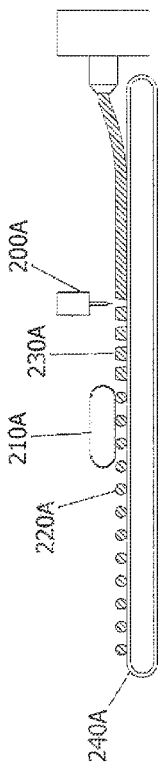
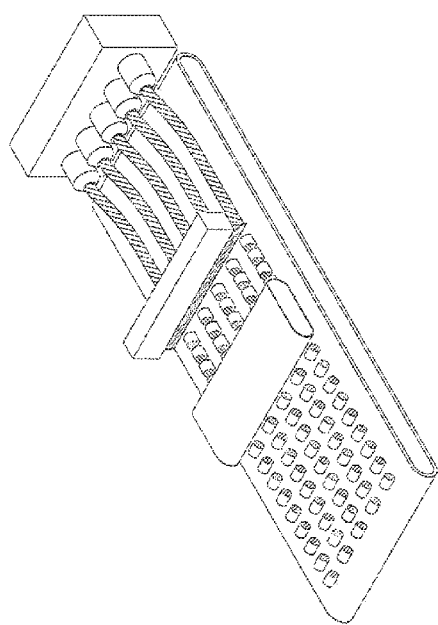
Fig. 2B
Fig. 2A
Fig. 2C

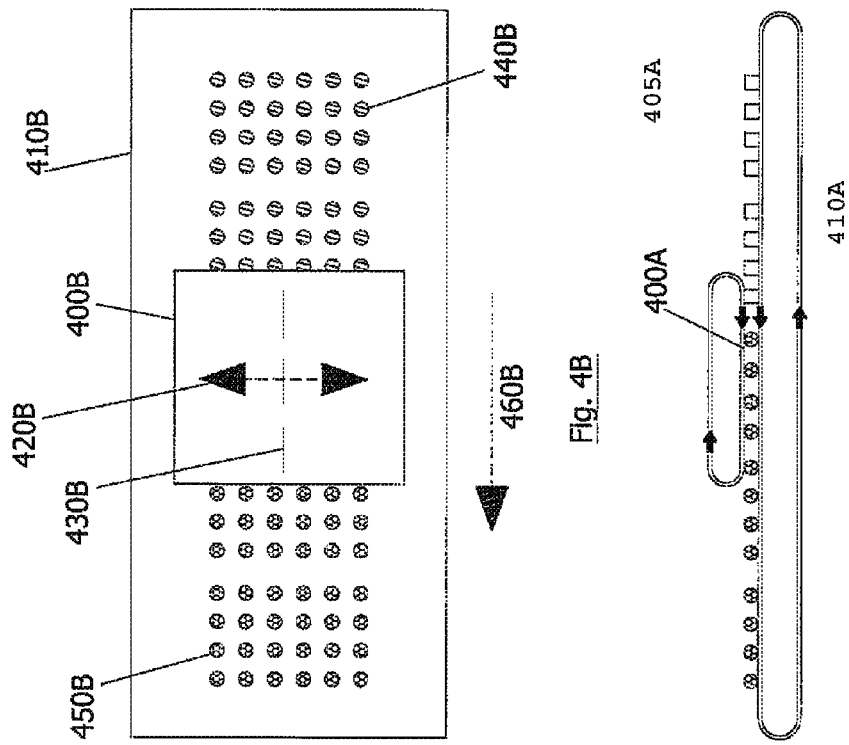
Fig. 4A
Fig. 4B
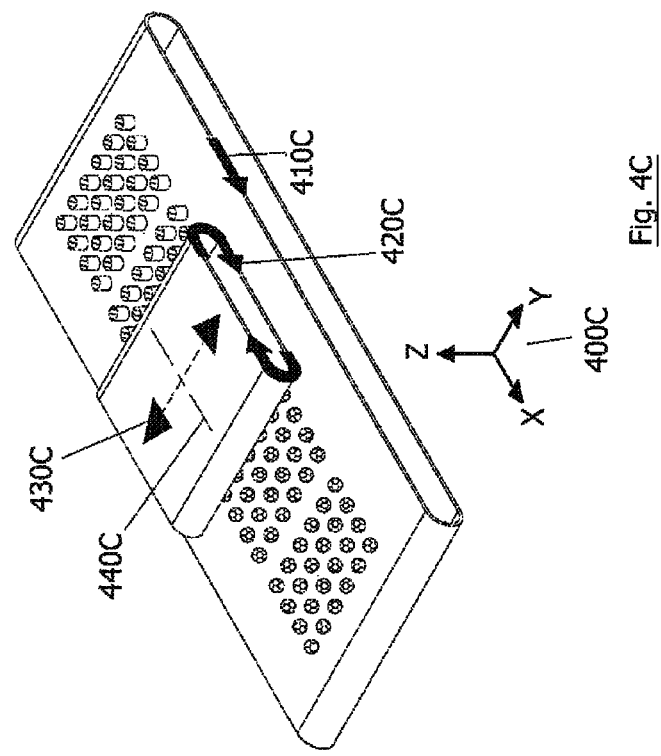
Fig. 4C

APPARATUS, SYSTEMS AND METHODS FOR MANUFACTURING FOOD PRODUCTS

FIELD OF THE INVENTION

The present invention generally relates to apparatus, systems and methods for manufacturing food, more specifically semi-moist, shelf-stable meatball products for animal consumption.

BACKGROUND OF THE INVENTION

A large and growing number of households have pets. Studies have shown that pet owners often treat their pets as they treat close friends and relatives. Owners include pets in holiday celebrations, and often refer to themselves as their pets' parents. Such affinity is tangibly demonstrated in the rapid growth of a multibillion dollar pet industry with an increasing demand for pet products that mimic human products.

Health conscious consumers are also demanding higher quality pet food that is not only closer in ingredient quality to human food, but also looks less processed and more natural. However, conventional pet food producers seldom focus on the visual impact of pet food that heightens aesthetic appeal to a purchaser, even if they integrate advanced ingredients more commonly found in food produced for human consumption.

People prefer to consume meatballs that are moist, preferably with sauce or gravy. Studies have shown that pets also prefer meatballs with intermediate levels of moisture, but such products are difficult to find on the market. The primary reason is that human grade meat products are usually designed for relatively short shelf lives, whereas pet food is engineered to be stored (if necessary) for eighteen months after manufacturing before it is consumed, and therefore requires a substantially longer shelf life. Human grade meat products, once opened, become stale in less than a week unless refrigerated. Pet treats, however, are expected to last for up to three months after the package is opened, without refrigeration. Moisture content in food is typically correlated with freshness duration and time to spoilage, whereby the higher the moisture content the shorter the shelf life or safe consumption time frame. The delay in the storage and consumption of pet foods requires more careful ingredient selection, preservation of freshness with antioxidants, processing that avoids insects and rancidity, careful packaging and storage. Because high moisture meat products tend to spoil quickly, such products are usually sold in cans in the pet food market, and are more typical as cat food. Pet food or kibble with low moisture content (typically less than 10%), are dry and hard, and less palatable to pets. Semi-moist pet food, typically having moisture content between 15 and 30%, is very popular with animals since it has a texture and palatability that is closest to meat. However, as discussed, semi-moist pet food is difficult to store in a stable condition, without canning or refrigeration, for long periods.

In a typical process for manufacturing meatballs for human consumption, frozen meat or poultry is ground with various flavors, flours or seasoning in a batch mixer and then pumped into one end of a meatball former where, on the other end, there is a mechanism that "portions" the meat into smaller parts. An oscillating iris valve has found widespread use as a device that can form spherical meat portions. When meat is pushed through the iris valve, each cycle separates the meat into roughly spherical strips which are then either frozen directly, or cooked and then frozen. The iris valve and other comparable processes used for making human grade meatballs are more suited for batch or semi-continuous operations. They are less amenable to high volume processing which is particularly important for pet food markets because of cost considerations.

Meatballs for pet consumption are typically made using scrap portions from human grade meat products, or offal and other byproducts. They are sometimes cooked, refrigerated and freeze dried and sold into the pet food market. However, such freeze-dried meatballs for pet consumption are brittle, crumble easily, contain very little moisture, are generally expensive, and have therefore not been popular with consumers. These freeze-dried "meatballs" also have to be packaged with care because they are not shelf-stable at room temperature.

Thus, neither conventional pet food manufacturing processes nor traditional food production techniques used for human consumption can meet the requirements of cost-effectively manufacturing semi-most meatballs products that remain shelf stable for long periods without refrigeration. Furthermore, there is no commercially viable method for producing such meatballs for animal consumption in a continuous manufacturing process, in high volumes, using either fill and form (mold) plates or extrusion techniques.

SUMMARY OF THE INVENTION

Illustrative embodiments of the present invention include apparatus, systems and methods for apparatus, systems and methods for manufacturing semi-moist meatballs for animal consumption. Specifically shown herein, as an illustrative embodiment is a method of manufacturing generally spherical pet treats comprising: (a) providing a ground mix of proteinaceous material, flavor enhancers and preservatives to a portioning device that divides said mix into smaller portions of roughly uniform volume, (b) placing said portions on a first belt of a first conveyor moving at a first speed in a longitudinal direction, (c) periodically pressing said portions with a second belt of a second conveyor, where said second belt operates in a plane at a height above, and substantially parallel to, said first belt, said second belt moving at a second speed in substantially the same longitudinal direction as said first belt, while also oscillating back and forth in a lateral direction that is at an angle to said longitudinal direction, such that said portions are transformed into generally spherical shapes.

It will be appreciated by those skilled in the art that the foregoing brief description and the following detailed description are exemplary and explanatory only, and are not intended to be restrictive thereof or limiting the invention. Thus, the accompanying drawings, referred to herein and constituting a part hereof, illustrate only preferred embodiments of the invention, and, together with the detailed description, serve to explain the principles of the invention.

BRIEF DESCRIPTION OF THE DRAWINGS

FIG. 2A-C provides perspective drawings illustrating one method for creating initial meatball portions through extrusion, according to an illustrative embodiment of the invention.

FIG. 4A-C shows a method for developing generally spherical meatballs with a rolling technique using a horizontally oscillating overhead conveyor, according to one illustrative embodiment of the invention.

DETAILED DESCRIPTION OF THE PREFERRED EMBODIMENT

Illustrative and alternative embodiments and operational details of apparatus, systems and methods to manufacture a plurality of generally spherical meatball products in a continuous process are discussed in detail below with reference to the figures provided. One preferred product, however, is an edible food product for animal consumption, more particularly semi-moist meatball treats for pets.

Figure 1:
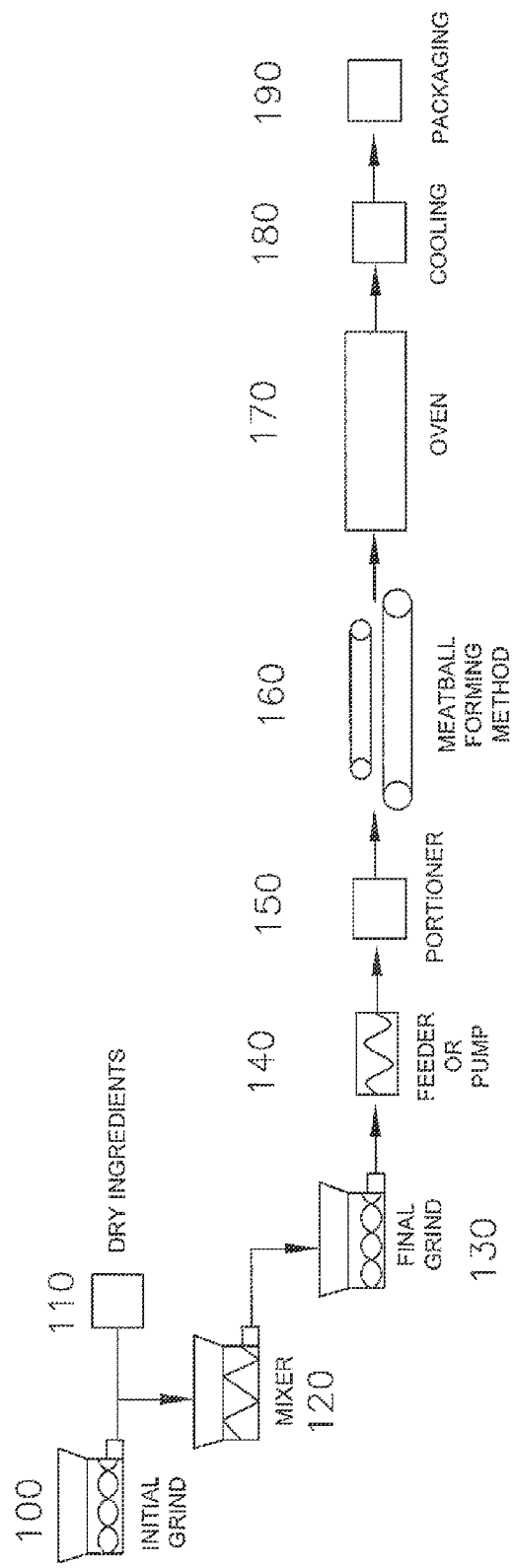
FIG. 1 is an overview of a process for making semi-moist meatballs, according to an illustrative embodiment of the invention.

In one illustrative embodiment of the invention shown in FIG. 1, frozen blocks of meat and/or poultry and/or any suitable proteinacious material are processed through a grinder plate (100) with 1/16"-3/8" openings. The ground meat is batched and mixed in a mixer (120), typically a double shaft mixer. Dry and/or wet ingredients (110) are added to the meat batch in the mixer at this point as well. The mixed batch is processed with a second grinder (130) having a grinder plate with 1/4" holes. The second grind helps cut the meat to produce both longitudinal fibers and smaller chunks of meat, forming a twice-ground meat emulsion that has the desired texture and consistency for extrusion. The additional grinding step can also contribute to the appearance and texture of the final meatball product. Note also that while the grinding and mixing steps described herein are a preferred embodiment, similar results can also be attained by separately sourcing pre-ground (and pre-mixed) proteins and other ingredients, and then using this externally sourced ground mix as the starting raw material to carry out the rest of the process steps described in FIG. 1 and below.

Meatballs are then made from the meat emulsion coming out of the final grind (130) in two steps—portioning (150) and rolling (160). In a production capacity, multiple meatballs can be portioned and roll formed simultaneously and, if desired, continuously. In the portioning step (150 or 160), the ground mix is sized to an appropriate shape and reasonably consistent volume/weight. It is important to ensure that there is reasonable spacing between the meaty portions when they are placed on the conveyor, in order to prevent collisions and fusing during the next process step (160—rolling). Generally the meaty portions should be spaced at approximately 1-3 times the desired diameter of the final meatball product. Typical meatball products are between 0.5" and 2.5" in diameter.

Figure 3B:
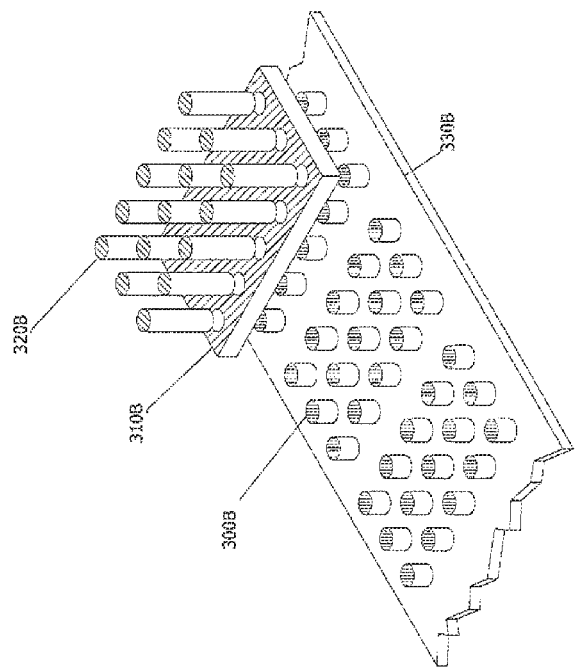
FIG. 3A-B is a method of creating initial meatball portions through mold plating, according to another illustrative embodiment of the invention.
Figure 3A:
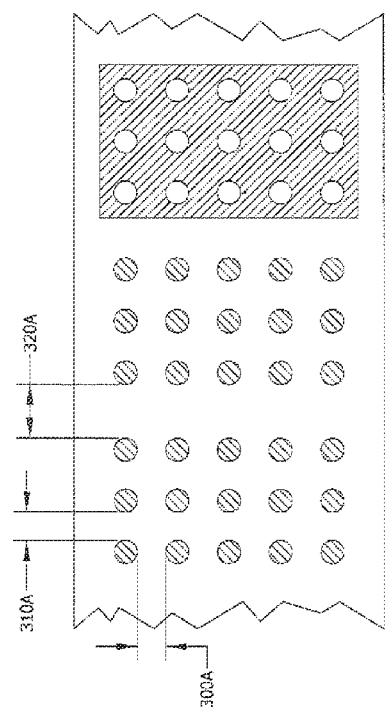

Two illustrative embodiments of the present invention for portioning meatballs are shown in FIG. 2 and FIG. 3. The first method (FIG. 2A-2C), an extrusion technique, involves first extruding rectangular or cylindrical ropes from the ground, mixed emulsion, and then cutting and spacing the extrudate rope, generally into smaller meaty, generally rod-shaped, portions. The second method (FIG. 3A-3B), a fill and form (molding) technique, involves forming multiple portions in a fill and form (mold) plate-knockout system. While these methods are only examples, it will be apparent to one skilled in the art that any method of portioning or dividing a food blend into smaller pieces or portions can be used, so long as each of these portions have at least one uniform lateral dimension and/or are of approximately the same volume/weight.

Referring to FIG. 1, the meat mixture is fed into a pump (140) which generates positive pressure for consistent extrusion which is the first step of an extrusion portioning technique (150). Referring to FIG. 2 for more detail, the meat mixture is then pumped through one or more nozzles (200B) at the exit of an extrusion manifold. The nozzle openings are close to the final desired diameter of the meatball (as will be discussed further below), and are also spaced apart at 1-3 times the desired meatball diameter (210B) to prevent downstream agglomeration on the belt caused by laterally adjacent meatballs colliding with each other. The meat mixture is continuously extruded in the form of ropes (220B) onto a transfer conveyor (230B). The ropes are cut to length by a reciprocating guillotine, or any suitable, industrial cutter (200A) located above the conveyor which provides the final sizing for the meaty portions (230A). To generate longitudinal spacing between the meaty portions, an overhead conveyor (210A) is set up above the transfer conveyor (240A) between the cutting and rolling equipment, and the overhead conveyor operates in the same longitudinal direction as the transfer conveyor. The overhead conveyor, typically running at a 40-80% higher speed than the transfer conveyor, pulls and rolls the meaty portions (FIG. 2A), while also creating longitudinal gaps between each consecutive set of portions 1-3 times the desired meatball diameter (240B). This longitudinal separation is again important to prevent downstream agglomeration on the belt caused by longitudinally adjacent meatballs colliding with each other. Thus, upon exiting this section of the process, the meaty portions are generally transformed to short meaty cylindrical shapes (220A), which are created in part by the faster rolling action of the overhead conveyor (210A).

Referring to FIG. 1, the meat mixture coming out of the grinder (130) is fed (140) into a meat mold plate portioning step (150). FIG. 3 shows more detail of this mold portioning step, which includes a forming machine consisting of a fill plate, mold plate, and breather plate. The fill plate ensures that all cavities in the mold plate (310B) are filled with the meat mixture, while the breather plate removes the air from the cavities. A proper pressure should be maintained to ensure that all cavities are correctly filled to minimize product irregularities. The air and minor portions of meat removed by the breather plate are circulated back into the hopper. The forming machine is set up to give meat portions in cylindrical form (300B), where the diameter of the cylinder is equal to its height, due to the circular holes in the mold plate (310B). Cylindrical holes or portions are ideal for efficiency and cleanliness, but different shapes can be used to form the portions. After filling, the mold plate extends beyond the filling area to the knockout area. Once exposed, the cavities in the mold plate are evacuated using knockout cups (320B) before returning to the fill area. The evacuated meat portions (300B) fall to a transfer conveyor (330B) located below. In a production setting, the number of portions evacuated at a time could be as many as 2-200 arranged in rows and columns on the mold plate. The spacing between the rows (300A) and columns (310A) should be 1-3 times the desired diameter of the final product. The forming should take place at a rate than ensures each portion is deposited onto a conveyor belt or takeaway system with enough room from neighboring portions (320A) that they will not be forced together during further processing.

FIG. 4 details the next step of the process—rolling (160)—which creates the final spherical shape and texture. "Spherical" as contained in the text herein refers to a shape that is approximately globular or roundish or oblate or spheroid, and is not necessarily a perfect sphere with a uniform diameter across its entire surface (though it also could be). Even a roughly round or globular or oblate or spheroid shape that has bumps, ridges and other protuberances that make it more of a shape similar to meatballs rolled imprecisely by hand are intended to be covered by the word, "spherical." In order to create the distinct spherical shape and texture of meatballs, an oscillating reciprocal overheard conveyor (400B) is used in conjunction with a bottom conveyor (410B). The overhead conveyor (400A) is placed at a specific distance (hereafter 'Δ") above the bottom conveyor, and the overhead conveyor moves in the same direction as the bottom conveyor, but at a faster speed. Typically the speed is about 40-80% faster than the speed of the bottom conveyor. This creates a net forward rolling motion of the meaty portions on the transfer conveyor that, absent any other force, would transform the portions into roughly cylindrical shapes with the cylindrical ends perpendicular to the direction of movement of the transfer and overhead conveyors. However, to generate the spherical shape of the meatball, the faster-overhead conveyor also moves back and forth (420B) across the transfer line (430B) to also move, press/massage and rotate the meaty portions in directions perpendicular to overall product flow (460B). Note that while a backwards motion or stationary plate overhead could potentially be designed to create the final spherical shape, it often causes a backup in the line, so a forward motion is more efficient, and a more preferred embodiment. Due to its unique horizontal oscillating and quick forward motions, it forms the meatball portions, previously cylinders (440B), into rough textured spheres (450B), similar to human grade meatballs. Note also that the rolling action to produce meatballs can also be accomplished when the direction of oscillation of the overhead conveyor is at an angle that is oblique to the bottom (transfer) conveyor.

To convert the portions (230A or 300B), whether they are cylindrical rods or rectangular rods, or any other non-spherical shapes of roughly uniform volumes, it should be recognized that the spherical meatballs of equivalent volume formed from these meaty portions will be higher in diameter than nominal length of the meaty rod. In other words, since the volume of the final spherical meatball is substantially the same as the volume of the meaty portions, the diameter of the spherical meatball produced is generally larger than the diameter of the equivalent meaty portion. For example, basic geometry dictates that, to make a spherical meatball of diameter $D_s$ from a cylindrical meaty rod of diameter $D_c$ and height $H_c$, where the two solids are expected to have the same approximate volume; i.e., $(4/3)*(\pi)*(D_s/2)^3 = (\pi)*(D_c/2)^2*(H_c)$; then the diameter of the equivalent sphere formed from the cylindrical rod is approximately determined from the following equation:

$$D_s = (D_c)^{2/3} * (1.5 * H_c)^{1/3}$$

Likewise, a similar calculation or approximation can be made if the portions made are not cylindrical rods, but rectangular rods, or possibly any other type of solid, as will be apparent to one skilled in the art. Once the expected diameters of the spheres are calculated, the distance between the conveyors Δ is typically designed to be slightly smaller, though it should be within approximately 10% of $D_s$. The final distance selected will also depend on, among other things, the composition of the proteinaceous blend, the viscosity, density, moisture content, surface tension and general stickiness of the mix. In a preferred embodiment, Δ is about 2-6% less than the desired $D_s$.

In practice, referring to FIG. 4A, it may also be useful to have an additional mechanism to correct for mismatches in alignment at the beginning of the meatball rolling process with the dual conveyors (405A). This mismatch may arise between the diameters of the incoming meaty rod portions ($D_c$), the distance between the conveyors (Δ), and/or the final diameter of the desired spherical product ($D_s$), and potentially cause the incoming meaty portions to start slipping or just sliding under the second belt without the rolling and massaging action. To compensate for such issues an additional element or mechanism (410A) can be added at the beginning of the roll process, such that the effective distance between the conveyors just at the beginning of the dual roll can be adjusted as necessary through this mechanism to ensure that the incoming non-spherical meaty rods are squeezed and catch both the conveyors and roll forward without slipping or sliding. One way to do this would be to have a slightly idler/roller/cylinder at this end of the second conveyor (410A), or even a sloped plate attached from the end of the conveyor (not shown), that effectively squeezes the incoming meaty rods between the two conveyors to ensure that there will be contact from both the top and bottom conveyors as the meaty rod portions get rolled into spherical meatballs. Such mechanisms can also prove useful in long term operation of the equipment to compensate for sag of the belts, and general wear and tear.

The type of conveyor belt chosen, along with its elasticity and flexibility characteristics, as well as the distance between the bottom and overhead conveyors, can affect the final surface texture of the meatball. Further, the elasticity or flexibility of the conveyor belts is a factor in shaping the meatballs. In a preferred embodiment of the invention, these belts are wire meshes that have a nominal opening size that is less than the desired diameter of the final meatball ($D_s$). The flexible belts of the bottom and overhead belts apply a slight pressure on the meat portions during rolling because of their elasticity, based on the dimensions of the desired meatballs. A small force is exerted downward from the overhead conveyor belt (negative Z direction shown in FIG. 4C, coordinates of 400 C), and a corresponding upward force (positive Z direction in FIG. 4C) from the bottom conveyor belt, that enhances the massaging action of the oscillator/roller in forming more firm and rounded meatballs. Typically, the force applied on the meatballs is generally, well below 10 psi, and more typically 0.5-3.0 psi. The texture of the belts or wire meshes also gets imprinted on the meatballs during rolling and helps provide the overall texture of the product. To ensure that the meatballs move without slipping between the bottom and overhead conveyors, it is also necessary that one of the conveyors has a relatively fine mesh size. The wire mesh used in the other conveyor can then be adjusted within the limits of the diameter of the meatball ($D_s$) depending on the surface texture that is desired. For instance, if a 1" meatball product is desired, the size of the wire meshes used in either conveyor typically cannot exceed 0.9". Further, at least one of the conveyors should have a wire mesh nominal size that is less than 0.25"—otherwise the portions will tend to slip between the conveyor belts rather than roll. The size of the belt with the generally larger wire mesh can be used to adjust the final texture of the product. For example, if the conveyor with the larger wire mesh has a 0.5" size, then more protuberances and a more coarsely ground meatier appearance is generally found in the final meatball product, whereas using a 0.2" wire mesh would make the meatball appear to have a finer minced meat appearance with finer protuberances. Generally speaking, larger protuberances are indicative of larger pieces of whole muscle meat and often an indicator of higher quality.

The meatballs exiting the oscillating/rolling step (160) of the process are then fed onto trays. The trays are then placed on carts, which are placed in a continuous oven (170). If trays were to be omitted and a continuous belt used instead, then the belt would feed into the oven. The meatballs are dried within a range between 130° and 250° F., preferably 140°-180° F., until the proper moisture content and proper water activity are achieved. This drying time is 1-8 hours, preferably 3-6. Higher the temperature used, shorter is the drying time required. The temperature and drying profile is important to prevent the generation of a skin or a shriveling effect to the meat in the product. After drying, the meatballs are cooled for 1-4 hours at ambient temperature (180) before continuing to further processing and/or packaging (190). A non-ambient cooling operation may also be used. The result is a meatball product with appearance and texture similar to human-grade meatballs.

While the foregoing description explains the manufacturing process used to make the product, it is also important to note that the type and relative proportions of ingredients used in making the product also plays a role in texture, semi-moist and appetizing appearance, as will be evident to one skilled in the art. In particular, the increased proportion of meat used in this process helps develop a rough texture that appears more like human grade meatball. Preservatives that inhibit microbial growth, grains that contribute to water absorption and suitable humectants that lower water activity are also important to the development of shelf-stable, intermediate moisture, meatball product for pets.

Two recipes (A and B) are shown below to demonstrate some typical proportions of proteins and other ingredients used in the beginning of the process (FIG. 1 at mixer 120) to make a meatball treat for animal consumption (numbers below are in weight percent):

| Component | Recipe A | Recipe B |
| --- | --- | --- |
| Meat/Animal Protein | 65% | 45% |
| Plant Protein | 5% | 8% |
| Starches | 25% | 40% |
| Flavors | 2% | 5% |
| Preservatives | 3% | 2% |
| TOTAL | 100% | 100% |

While the recipes above are specific, TABLE 1 below illustrates the broader ranges of composition of the key components that can be used in conjunction with the process described herein to make roughly spherical proteinaceous food treats for animal consumption. Some of these combinations would also be useful for making long-lasting products for human consumption, as will be appreciated by one skilled in the art. Note also that many of these starting ingredients (e.g., beef or chicken or vegetables) inherently contain water.

TABLE 1

| Category | Typical examples/comments | Proportion (wt %) |
| --- | --- | --- |
| Proteins | Chicken, beef, pork, turkey, venison, duck, etc., or a combination. Premium and lower grade meats, or offal, could also be used. Meat analogs such as soy or vegetable protein can also be used for developing more healthy snacks. | 15-75% |
| Flours/Starch/ Carbohydrates | Wheat, soy, corn, tapioca, etc., or a combination | 0-20% |
| Vegetables/ Fruits | Apples, banana, sweet potato, cranberry, carrots, peas, etc., or a combination | 0-10% |
| Flavor enhancers | Sugar, salt, garlic, onion, digests. | 5-20% |
| Preservatives | Potassium sorbate, sorbic acid, butylated hydroxyanisole (BHA), butylated hydroxytoluene (BHT), mixed tocopherols, calcium propionate, zinc propionate, rosemary extract, citric acid, sodium erythobate, | 0.01-5% |

Accelerated testing studies have also indicated that recipes A and B produce pet products that are shelf stable for at least 18 months, maintaining a stabilized intermediate moisture content (15-30% by weight, usually 18-26%), and stabilized water activity (Aw ranging from 0.60 to 0.78, usually 0.65-0.75%) without refrigeration under normal conditions of storage in homes or stores that are reasonable and expected for the packaged pet foods industry. The ingredient mix, within the composition ranges in TABLE 1 provided above, can also be adjusted as needed by one skilled in the art to ensure that similar stabilized moisture content and water activity is achieved to create final packaged products that are semi-most and shelf-stable for at least 18 months.

It will be apparent to one skilled in the art that the final shape and texture of the end products, and their size and thickness distributions, can be pre-designed and/or manipulated on-the-fly during the manufacturing process by pre-selecting and/or dynamically adjusting various process variables. These variables include, but are not limited to, the following:

1. The size of the mold plate system or the extrusion nozzles, depending on which portioning system is used.
2. The speeds of the conveyors, and the relative speeds between the bottom conveyor and the overhead conveyor.
3. The amplitude and frequency of oscillation of the overhead conveyor
4. Variations in composition of the blend of proteinaceous material, preservatives, humectants, grain, starch, etc., that are used can in turn affect a variety of processing variables such as: (a) surface tension of the ground mix that allows for a stable meatball formation, extrusion and/or rolling; (b) Water activity of the final product and thereby its impact on shelf stability. For instance, increasing the meat concentrations and lowering or eliminating carbohydrates will increase the leathery, grainy or wrinkled texture of the product. Note that increasing the ratio of premium muscle meat to lower grade meat (including offal), will also increase grainy texture but this should be balanced with commercial considerations such as cost and consumer preferences. To some extent, the composition can also be adjusted dynamically during processing by adding multiple feed points, each independently controllable, instead of the fixed ingredients addition shown as (110 in FIG. 1).
5. Operating conditions such as temperature, pressure and humidity within the various steps of the processes of FIG. 1.

While the invention has been described in conjunction with specific embodiments, it is evident that many alternatives, modifications, permutations and variations will become apparent to those skilled in the art in light of the foregoing description. Accordingly, it is intended that the present invention embraces all such alternatives, modifications and variations as fall within the scope of the claims below.

What is claimed is:

1. A method of manufacturing generally spherical pet treats comprising:
    (a) providing a ground proteinaceous mix to a portioning device that divides said mix into smaller portions of roughly uniform volume,
    (b) placing said portions on a first belt of a first conveyor moving at a first speed in a longitudinal direction,
    (c) periodically pressing said portions with a second belt of a second conveyor,
        where said second belt operates in a plane at a height above, and substantially parallel to, said first belt, said second belt moving at a second speed in substantially the same longitudinal direction as said first belt, while also oscillating back and forth in a lateral direction that is at an angle to said longitudinal direction, such that said portions are transformed into generally spherical shapes.

2. The process of claim 1 wherein said portioning is done using a fill and form molding process.

3. The process of claim 1 wherein said portioning is done by extruding said blend through at least one rectangular or circular die plate to form at least one rectangular or circular extrudate rod, followed by cutting said extrudate rod into roughly uniform pieces.

4. The process of claim 1 wherein said angle is approximately perpendicular.

5. The process of claim 1 wherein said height varies between A and B, where A is slightly less than the diameter of an equivalent sphere that has approximately the same volume as a said portion, and B is about 0.9 multiplied by A.

6. The process of claim 1 wherein at least one said first or second belts is textured.

7. The process of claim 1 wherein said second speed is between 40-80% faster than said first speed.

8. The process of claim 1 where said first and second belts are wire meshes.

9. The process of claim 1 where said portions are placed in such a way that the distance between any two portions placed adjacently is approximately between 1 and 3 times the desired diameter of the spherical pet treat.

10. The process of claim 1 wherein pressure exerted on said portions being pressed by said first and second belts is less than 10 psi.

\* \* \* \* \*